United States Patent
Little et al.

(10) Patent No.: US 8,190,653 B2
(45) Date of Patent: *May 29, 2012

(54) AUTOMATIC FILE CONVERSION TO A TARGET FORMAT

(75) Inventors: Robert A. Little, Redmond, WA (US); Jonathan Bailor, Bellevue, WA (US); Benjamin J. Bunker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/850,525

(22) Filed: Aug. 4, 2010

(65) Prior Publication Data

US 2010/0299371 A1 Nov. 25, 2010

Related U.S. Application Data

(63) Continuation of application No. 11/729,280, filed on Mar. 27, 2007, now Pat. No. 7,788,290.

(51) Int. Cl.
*G06F 7/00* (2006.01)
*G06F 17/30* (2006.01)
(52) U.S. Cl. ...................................................... 707/803
(58) Field of Classification Search .................... None
See application file for complete search history.

(56) References Cited

U.S. PATENT DOCUMENTS

| 5,652,876 | A | 7/1997 | Ashe et al. | 703/26 |
|---|---|---|---|---|
| 6,092,114 | A | 7/2000 | Shaffer et al. | 709/232 |
| 6,140,568 | A | 10/2000 | Kohler | 84/616 |
| 6,662,186 | B1 | 12/2003 | Esquibel et al. | 707/101 |
| 7,194,474 | B2 | 3/2007 | Birdwell et al. | 1/1 |
| 7,788,290 | B2 | 8/2010 | Little et al. | 707/803 |

*Primary Examiner* — Uyen T. Le
(74) *Attorney, Agent, or Firm* — Merchant & Gould

(57) ABSTRACT

A conversion tool that is automatically launched enables file formats not understood by a given application to be opened by that application. The converter registers for file types that are not already associated with an application used by the system. When a file that is not supported by another application is opened, the converter automatically converts the file to the target format and then opens the file causing the application that is registered for the target format to be launched.

20 Claims, 3 Drawing Sheets

AUTOMATIC FILE CONVERSION TO A TARGET FORMAT

RELATED APPLICATIONS

This application is a continuation of and claims priority to application Ser. No. 11/729,280, filed Mar. 27, 2007, entitled AUTOMATIC FILE CONVERSION TO A TARGET FORMAT, granted as U.S. Pat. No. 7,788,290, which is hereby incorporated in its entirety by reference.

BACKGROUND

File formats can change when upgrades are made to software applications. When a file format changes, a previous version of the application is not able to open a file that is created using the new format. Therefore, in order to collaborate, a common file format needs to be used by both the new version of the application and the previous version of an application. This results in the new version of the application having to use an older file format until an upgrade to a new version of the application is complete.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Through the use of automatic conversion tool, an application is able to open a file that uses a file format that is not understood by the application. The conversion tool is registered to handle file types that are not already associated with an application. When a file is opened that is not associated with an application, the conversion tool automatically converts the file to a target format and then opens the file causing the application registered for the target format to be launched. As such, a file may be shared between an upgraded application that uses a different file format and a previous version of the application without having to maintain two different copies or specifically saving the file in a format that is understood by both versions of the application.

DETAILED DESCRIPTION

Figure 1:
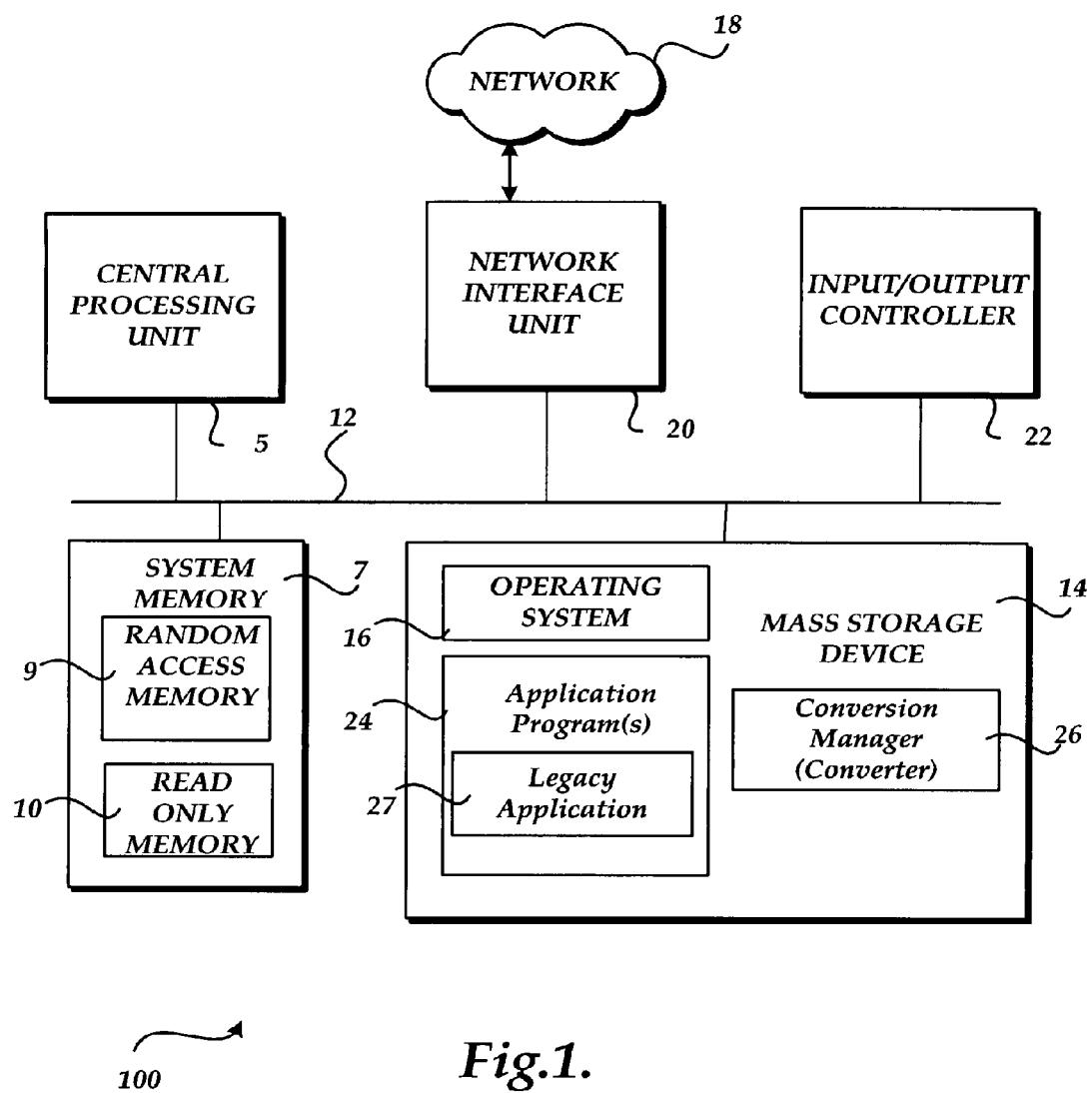
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 10, and a system bus 12 that couples the memory to the CPU 5. A basic input/output system containing the basic routines that help to transfer information between elements within the computer, such as during startup, is stored in the ROM 10. The computer 100 further includes a mass storage device 14 for storing an operating system 16, application programs 24, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS VISTA operating system from MICROSOFT CORPORATION of Redmond, Wash. The mass storage device 14 and RAM 9 may also store one or more program modules. In particular, the mass storage device 14 and the RAM 9 may store one or more application programs 24. The conversion manager 26 is operative to automatically convert a file from a first format to a target format for an application, such as legacy application 27. For example, a file that is created by a new version of an application may be automatically opened by legacy application 27 even though legacy application 27 does not understand the format of the file created by the updated application. Conversion manager 26 registers with the operating system 16 the file types that it understands and can convert to a target format. According to one embodiment, conversion manager 26 registers for the file types that are not already associated with another application program 24. Therefore, when a file is opened that has a file type that is registered with the conversion manager 26, conversion manager 26 will check to see if another application, such as legacy application 27, is registered to handle the target format. If the legacy application 27, or another application, is registered for the target format, then conversion manager 26 automatically converts the file and opens the converted file which results in launching the registered application. In this way, legacy applications can seamlessly collaborate with upgraded versions of applications that use a different format as compared to the legacy application.

Although conversion manager 26 is shown separately from application programs 24, it may be included directly within an application program 24 or at some other location. For example, the conversion manager 26 may be included directly within a program, the operating system 16, and the like. The operation of conversion manager 26 will be described in more detail below.

Figure 2:
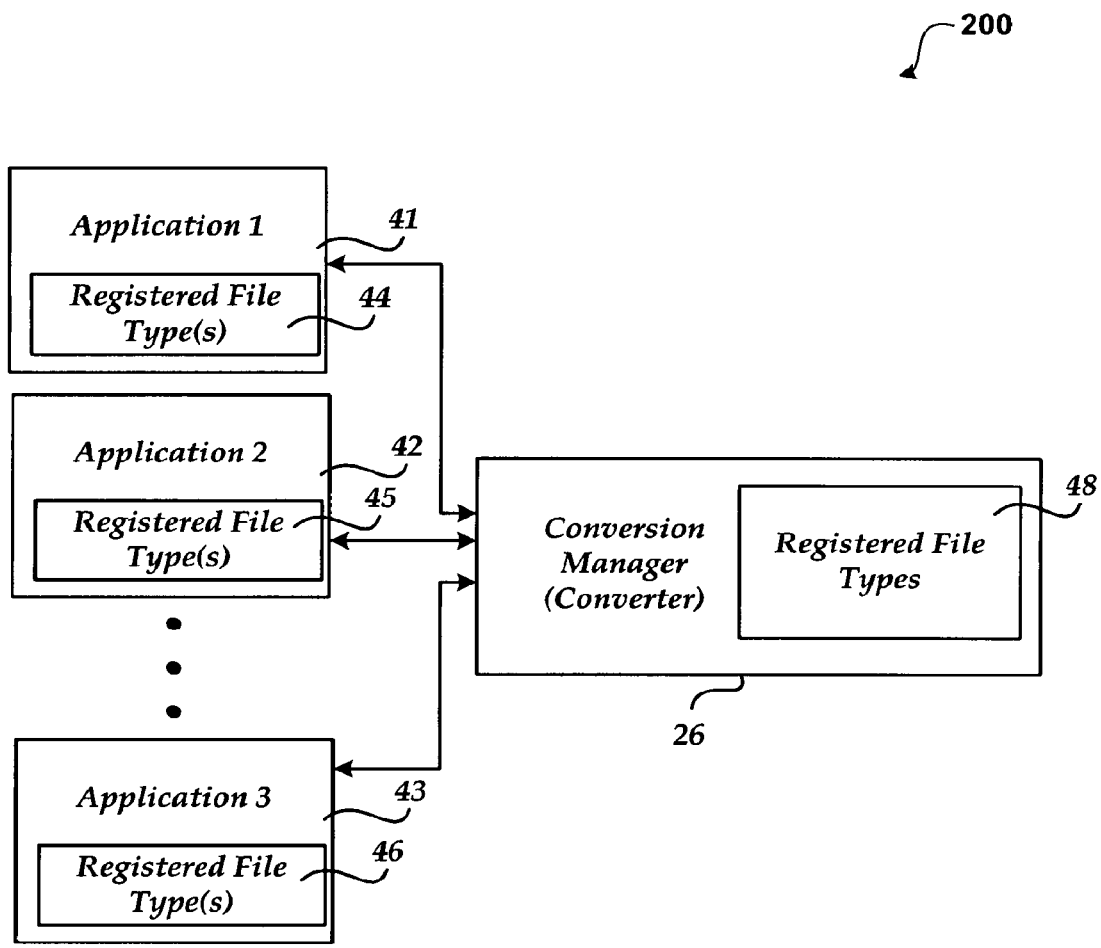
FIG. 2 shows file conversion system for automatically converting a file to a target format for an application.

FIG. 2 shows file conversion system 200 for automatically converting a file to a target format for an application. As illustrated, file conversion system 200 includes application programs 41-43 and conversion manager 26.

Conversion manager 26 automatically converts a file to a target format such that one of the applications (41-43) can open the file. Conversion manager 26 is a file converter that converts to/from various file formats. Conversion manager 26 may be configured to convert between any desired formats. For example, the conversion manager 26 may be configured to convert to/from the binary and Open XML file formats offered in MICROSOFT WORD, EXCEL, and POWERPOINT 2007. Conversion manager 26 registers to handle file types that it can convert and that are not registered by another application. In FIG. 2, conversion manager 26 registers for the file types that are not registered already by applications 1-3 (44-46). According to one embodiment, when the conversion manager 26 is installed it associates itself with the file types that are not already associated with one of the applications installed on the system (e.g. applications 1-3 (41-43)). Accordingly, installing the converter does not change the existing behavior when a user opens a file. The conversion manager 26 may also be configured to register file types at different times. For example, conversion manager 26 may be updated whenever a new target type is to be handled.

When a file type that is registered with the conversion manager 26 is opened, such as by double clicking on the file, the conversion manager 26 will check to see if another application is registered to handle the target file format that would result from conversion. If another application is registered to handle the target file format, the conversion manager 26 automatically converts the file to the target format and performs a shell execute on the converted file thereby executing the converted file and causing the registered application to be launched. If another application is not registered, the conversion manager 26 may provide an option to save the file in another format.

The following is an example of the use of conversion manager 26 and is not intended to be limiting. Suppose that MICROSOFT OFFICE 9 installed. When the conversion manager 26 is installed, it associates with the Open XML file types since the binary file types have already been spoken for by OFFICE 9. Therefore, if a user double clicks on a .xls file, it is opened in EXCEL 9 as it always has. If the user double clicks on a .xlsx file, then the conversion manager 26 is called since it registered for the .xlsx file type. The conversion manager 26 checks to see if an application is registered to handle the .xls file type that will result from conversion. In this example, EXCEL 9 is configured to handle the .xls file type. The conversion manager 26 converts the .xlsx file to an .xls file and then instructs MICROSOFT WINDOWS to execute the file thereby causing EXCEL 9 to boot and load the converted .xls file.

Figure 3:
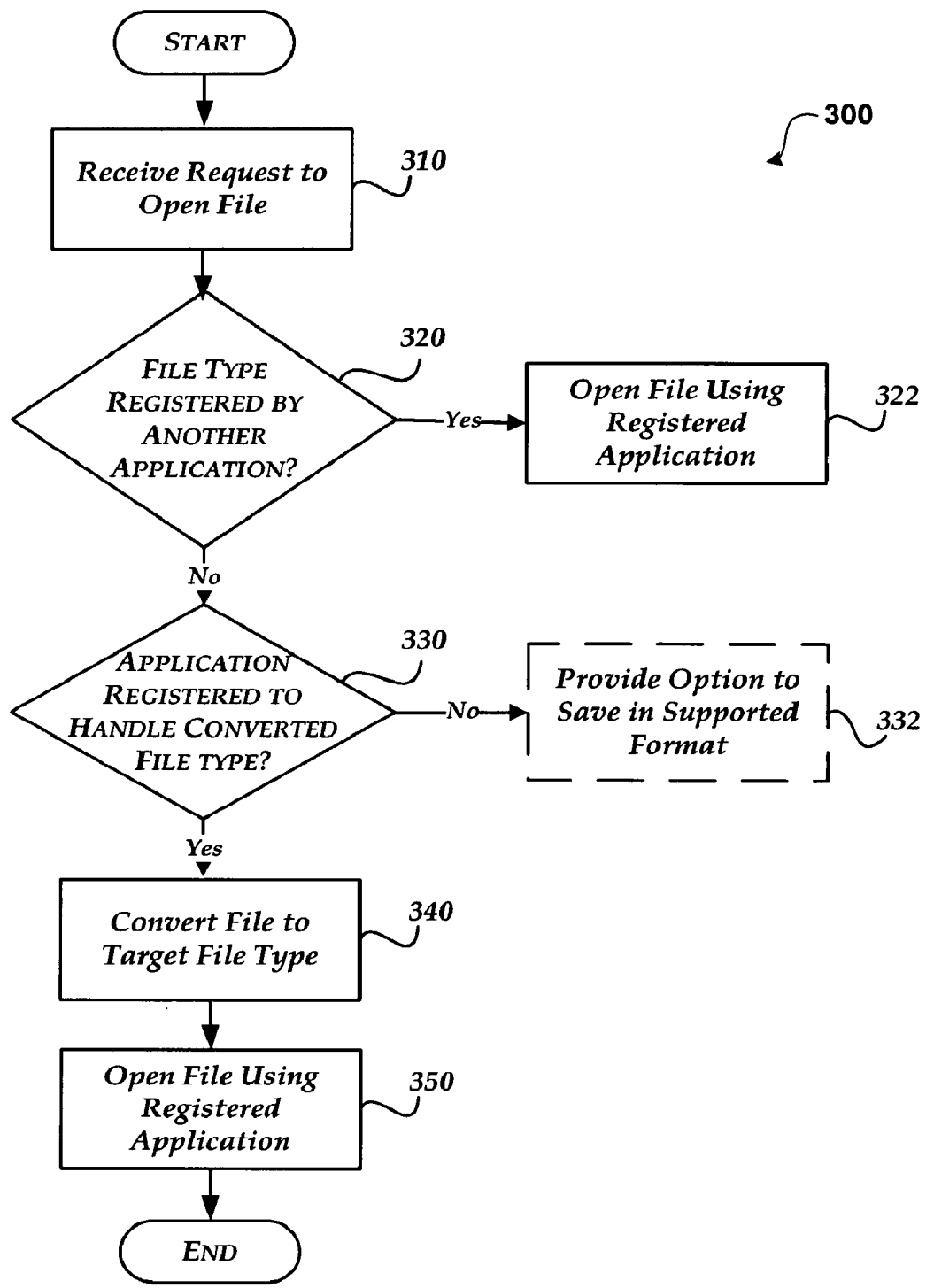
FIG. 3 shows an illustrative process for converting a file to a known target file type.

Referring now to FIG. 3, an illustrative process for converting a file to a known target file type and format is described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 310, where a request to open a file is received. A request to open a file may be received many different ways such as double clicking on the file, right-clicking on the file, and the like.

Moving to decision block 320, a determination is made as to whether the file type is registered to another application. When a file type is already registered to another application then there is an application that understands the file type and no conversion is required. When the file type is registered by another application, the process flows to block 322 where the file is opened using the registered application.

When the file type is not registered by another application, the process flows to decision block 330 where a determination is made as to whether there is an application to handle the target file type resulting from a conversion of the file. When there is not an application registered to handle one of the file types supported by the converter, the process flows to block 332 where the converter may provide an option to convert the file to a supported format and save the resulting file.

When there is an application registered to handle the target file type, the process flows to block 340 where the file is converted to the target file type. For example, a file may be converted from a .docx file type to a .doc file type so that MICROSOFT WORD 2003 can open the file.

Flowing to block 350, the file is opened using the registered application for the target file type. According to one embodiment, a shell command is issued to open the file type which in turn causes the registered application to be launched.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method executing on a processor of a computing device for converting a file to a target file type, comprising:
   receiving a request to open a file having a file type that is registered by a converter;
   automatically launching the converter in response to the request to open the file;
   converting the file to the target file type; and
   causing an application that is different from the converter to launch and open the converted file.

2. The method of claim 1, further comprising registering with the converter file types that are not registered by other applications.

3. The method of claim 1, wherein converting the file comprises using a registered file type that is associated with the application.

4. The method of claim 1, further comprising determining whether the application is registered to handle the target type.

5. The method of claim 4, further comprising providing an option to save the converted file in a supported format.

6. The method of claim 1, further comprising issuing a shell command to open the converted file.

7. A computer-readable storage medium having computer-executable instructions for converting a file to a target type, the instructions comprising:
   receiving a request to open the file, the file having a type that is registered with a converter;
   in response to receiving the request to open the file, automatically launching a converter;
   converting the file to the target type using the converter; and
   issuing a request to open the converted file, the request to open the converted file causing an application that is different from the converter to be launched.

8. The computer-readable storage medium of claim 7, further comprising registering file types with the converter that are not registered by other applications.

9. The computer-readable storage medium of claim 7, wherein converting the file to the target type comprises determining the target type to convert the file to based on a registered file type of the application.

10. The computer-readable storage medium of claim 7, wherein launching the application comprises opening the converted file such that the application is automatically launched.

11. The computer-readable storage medium of claim 7, further comprising providing an option to save the converted file.

12. The computer-readable storage medium of claim 7, wherein launching the application comprises issuing a shell command to open the converted file.

13. A system for converting a file to a target type, comprising:
   a processor and a computer-readable medium;
   a first application that is registered for the target type;
   a file having a type that is registered with a converter;
   in response to receiving a request to open the file, launching the converter, wherein the converter converts the file to the target type and
   issuing a request to open the converted file causing the first application to launch.

14. The system of claim 13, wherein the converter is further configured to register the file types that are not registered by other applications.

15. The system of claim 13, wherein the converter is further configured to determine file types that are supported by the other applications.

16. The system of claim 13, wherein automatically converting the file to the target type comprises determining at least one of the registered file types that is associated with the first application.

17. The system of claim 13, wherein the conversion manager is further configured to provide an option to save the converted file.

18. The system of claim 13, wherein issuing the request to open the converted file such that the first application is launched comprises issuing a shell command to open the converted file.

19. The system of claim 13, wherein the conversion manager is a part of the first application.

20. The system of claim 13, wherein the first application is a legacy application.

* * * * *